United States Patent [19]

Doster et al.

[11] 4,283,430
[45] Aug. 11, 1981

[54] PREPARING CENTERFILLED FOOD PRODUCT

[75] Inventors: Robert C. Doster, Van Nuys; Beth R. Judson, Northridge; Kathleen G. Soo Hoo, Granada Hills, all of Calif.

[73] Assignee: Carnation Company, Los Angeles, Calif.

[21] Appl. No.: 75,613

[22] Filed: Sep. 14, 1979

Related U.S. Application Data

[63] Continuation-in-part of Ser. No. 787,697, Apr. 14, 1977, abandoned.

[51] Int. Cl.³ .................. A21D 13/00; A23G 3/00
[52] U.S. Cl. .................................. 426/284; 426/94
[58] Field of Search ............. 426/94, 103, 282, 283, 426/284, 279, 138, 549, 553, 92, 496

[56] References Cited

U.S. PATENT DOCUMENTS

| 3,477,851 | 11/1969 | Benson et al. | 426/283 |
| 3,480,445 | 11/1969 | Slaybaugh | 426/284 |
| 3,615,147 | 10/1971 | Hayashi | 99/450.7 |
| 3,764,715 | 10/1973 | Henthorn et al. | 426/283 |

OTHER PUBLICATIONS

Sultan, W. J., *Practical Baking*, The AVI Publishing Co., Inc.; Westport, Conn.; (1965), pp. 150, 272.

*Primary Examiner*—Joseph M. Golian
*Assistant Examiner*—Elizabeth J. Curtin

[57] ABSTRACT

A tubular centerfilled food product having a rigid, friable, thermoplastic baked outer shell and a core of edible filling material is produced by a continuous, straight-through process. A semi-liquid batter having a relatively high content of mono- and/or disaccharides is carried between a pair of spaced-apart moving heated surfaces and baked to form a continuous, elongated flat thermoplastic sheet having a controlled thickness. The continuous thermoplastic sheet while warm and pliable is rolled around its longitudinal axis to form a continuous tube having a closed longitudinal, non-overlapping seam. As the baked sheet is rolled around its longitudinal axis, an edible filling material is injected into the core of the continuous tube as it is formed. The filled tube is cooled until the outer shell becomes rigid and is then cut into pieces of a desired length.

13 Claims, 7 Drawing Figures

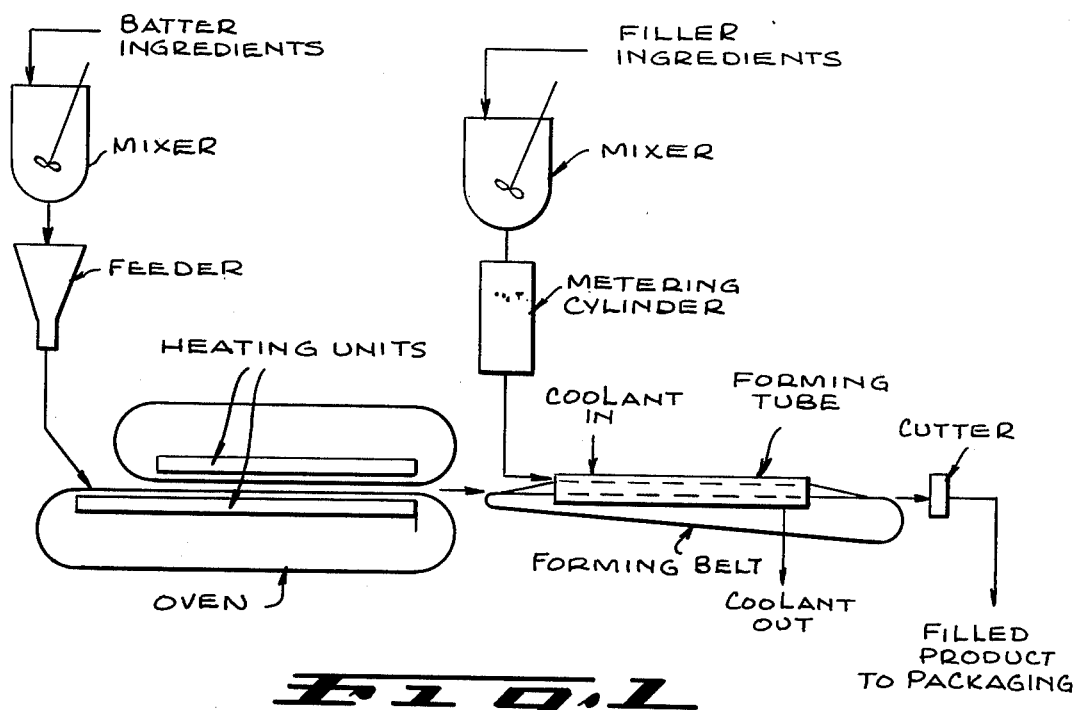
Fig. 1
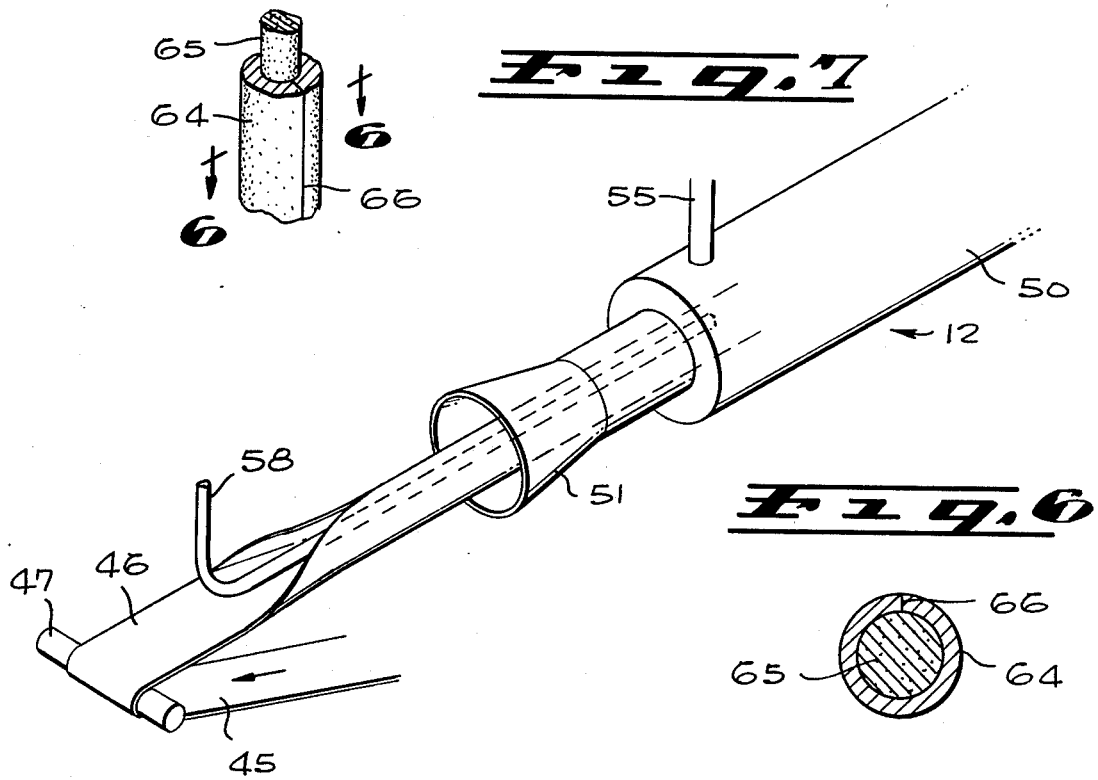
Fig. 5
Fig. 7
Fig. 6

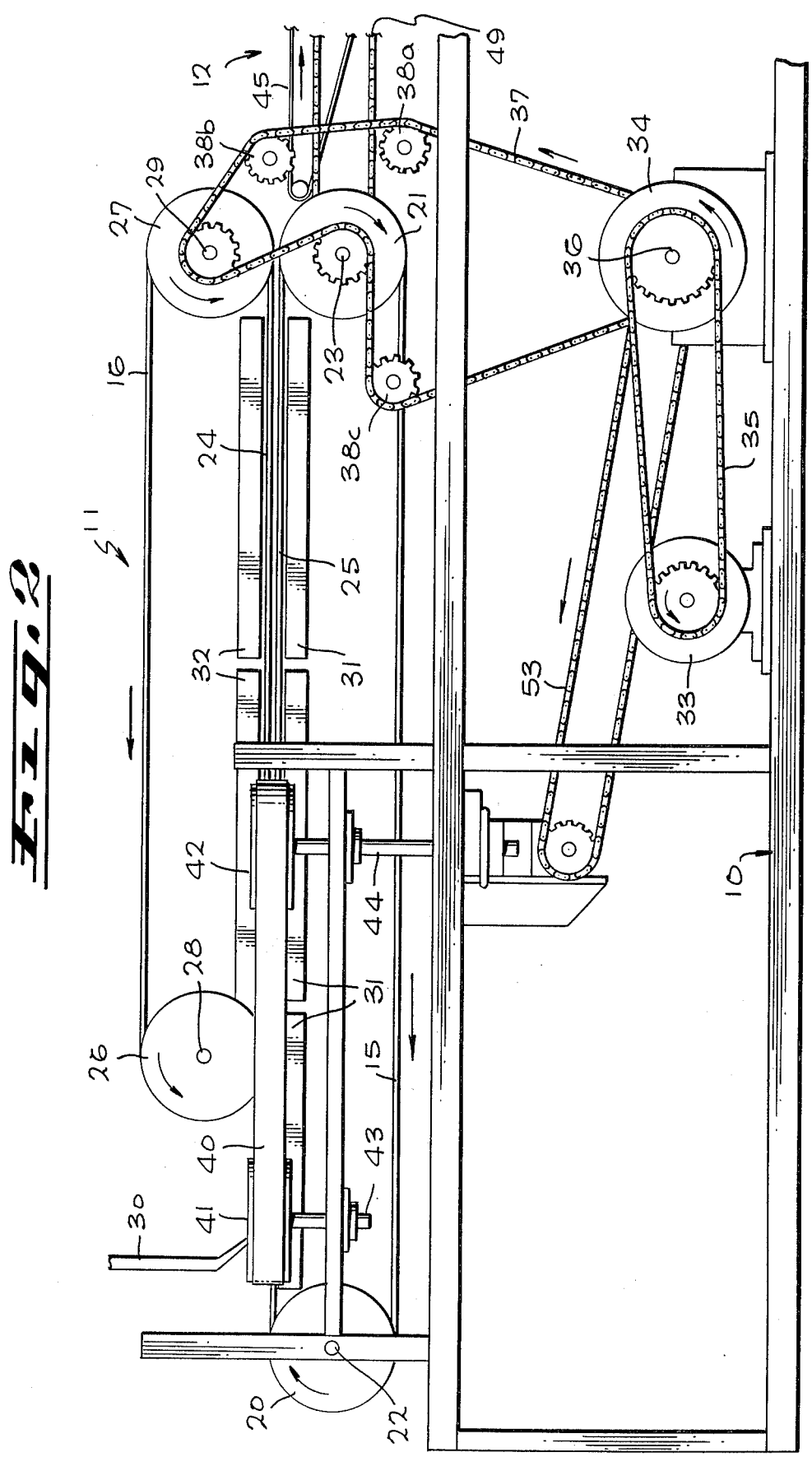

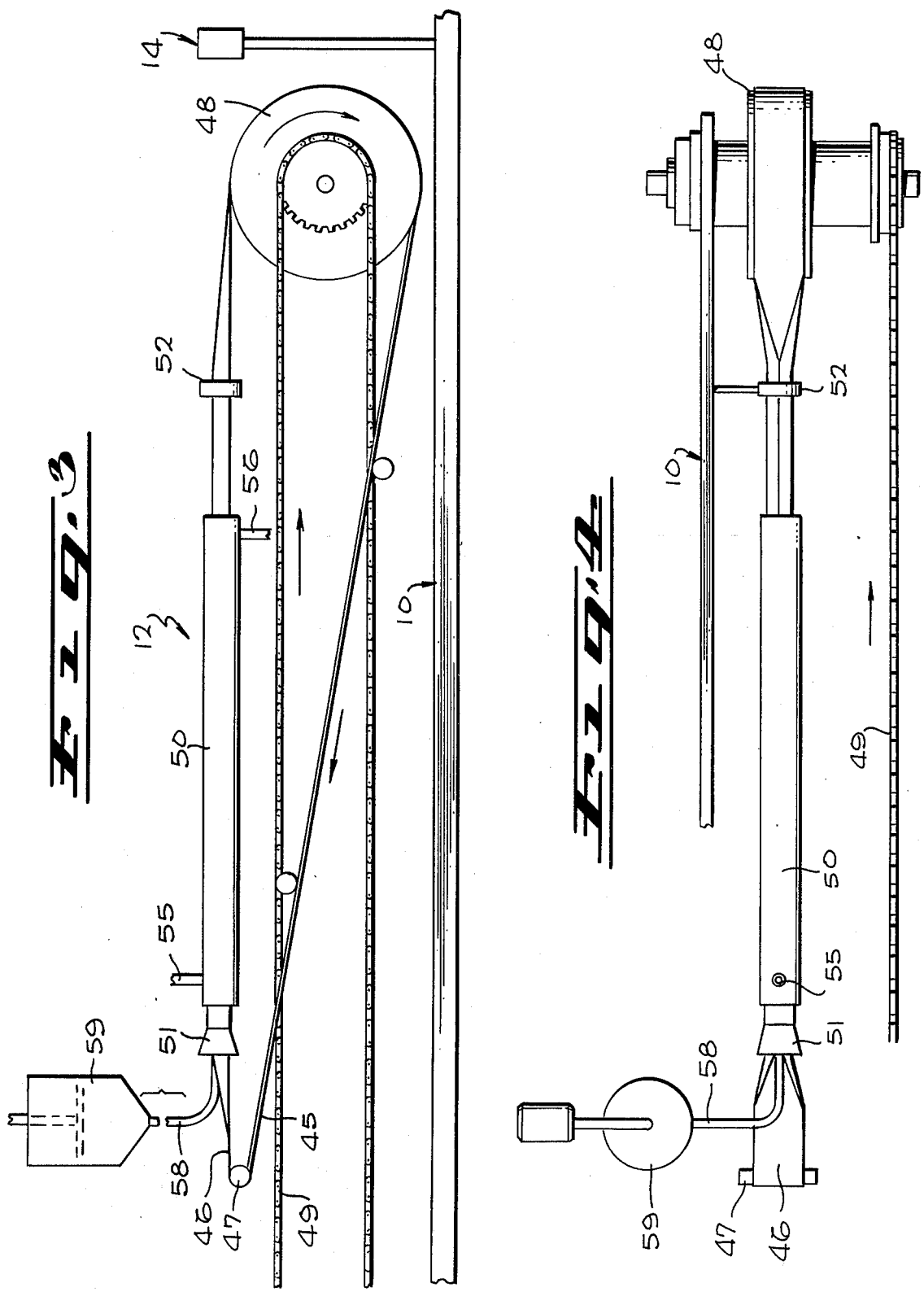

PREPARING CENTERFILLED FOOD PRODUCT

RELATED APPLICATIONS

This is a continuation-in-part of copending application Ser. No. 787,697, filed Apr. 14, 1977 now abandoned.

BACKGROUND OF THE INVENTION

This invention relates to a novel centerfilled food product and to the process for its production. More particularly, the invention is directed to the production of a tubular centerfilled food product, having a rigid, friable, thermoplastic baked outer shell and a core of edible material surrounded by the shell, by a continuous, straight-through process.

A number of methods have been used heretofore to provide cylindrical centerfilled food products. Such prior methods frequently have involved extruding a mixture of a farinaceous material and water through a restricted orifice into a tubular configuration, under conditions such that the tubular product is puffed or expanded as it emerges from the orifice. The tubular product is cut to length and cooled, and a desired filling is injected into the core of the puffed tubular body. Such methods suffer from the disadvantage that a number of separate steps are involved, each requiring separate handling of the fragile expanded tubular product. Also, because of the high temperatures and pressures to which the mix is subjected in the extruder, the ingredients which may be used in the mix are limited. For example, if the mix has a sugar content of above about 10%, the product tends to scorch or burn during extrusion. As a result, such expanded, extruded products must have a shell which consists essentially of cereal, and accordingly has a high starch content. Since the starch is gelatinized during extrusion, the shell portion of such extruded products is permanently rigid in nature. Moreover, since the puffed tubular body has a relatively high moisture content, usually between about 20%-25%, after extrusion, it must be dried before a desired filling can be injected into the core.

Another procedure which has been disclosed heretofore involves mounting a plurality of cylindrical molds on an endless conveyor, each of the molds having a rod extending horizontally into its interior. A dough is filled into the mold, and the mold carried into an oven for baking. The baked dough tubes are then stripped from the rods and held in a suitable manner to permit filling. This procedure also suffers from the disadvantage that separate shell forming and filling steps are required, each requiring separate handling of the product.

It is readily apparent that a process for making baked centerfilled food products in which the shell is filled simultaneously with its formation would be desirable for it would reduce the number of handling steps involved. Heretofore the only procedure disclosed for such a simultaneous shell forming and filling operation involves a co-extrusion operation in which a shell of cereal dough is extruded around a core of a filling material. However, as noted above, due to the temperatures and pressures to which materials are exposed in the extruder, the ingredients which can be used in such a co-extrusion operation are restricted to thereby limit the type of products produced. In addition, since the puffed tubular body must be dried after extrusion, only filling materials which are not adversely affected by such drying temperatures may be used in such a coextrusion process.

SUMMARY OF THE INVENTION

Briefly, the product of the present invention is a baked, centerfilled product which comprises a rigid tubular thermoplastic shell of baked comestible material having a bulk density of above 30 lbs. per cu. ft. and a closed longitudinal, non-overlapping or butted seam, and a core of edible material having a low water activity such as confectionary creme, fruit paste, meat paste and the like, surrounded by the tubular shell.

The method of this invention involves baking a continuous layer of a semi-liquid batter mixture having a relatively high content of mono-and/or disaccharides to a relatively low moisture content to form a continuous ribbon or sheet having a controlled thickness, the continuous sheet being thermoplastic while at a temperature of about 210° F. and above, due to its high content of mono-and/or disaccharides. The continuous baked sheet, while warm and pliable, is rolled around its longitudinal axis until the edges of the sheet are butted together to form a continuous tube having a closed longitudinal, non-overlapping seam. A viscous edible filling material which has a low water activity is continuously injected or otherwise deposited into the core of the continuous baked tube, as the tube is formed, to fill the core, and the centerfilled tube is cooled. Upon cooling, the baked outer shell becomes rigid, crisp and friable so that it retains its tubular shape without opening of the closed butted seam. However, because of the thermoplastic character of the tubular shell, it becomes flexible and pliable upon reapplication of heat. The cooled, centerfilled tubular product is then cut into pieces of desired lengths.

The product of the present invention is produced using apparatus which includes a pair of opposed heated moving surfaces for baking a layer of a semi-liquid batter into a continuous strip or sheet having a substantially uniform controlled thickness. Tube forming means positioned adjacent the heating means receives the continuous sheet of baked material discharged from the heating means while the baked sheet is still in a plastic or pliable state. The tube forming means is adapted to roll the continuous sheet around its longitudinal axis until the edges of the sheet are butted together to thereby form a continuous tube having a longitudinal, butted or non-overlapping seam. A filling tube extends axially into the tube forming means at the inlet end thereof for filling the core of the continuous tube with an edible material. The centerfilled tube is retained in the tube forming means until the baked outer shell has cooled sufficiently to become rigid and friable. A cutter is positioned adjacent the discharge end of the tube forming means for cutting the continuous centerfilled tube into pieces of desired lengths.

BRIEF DESCRIPTION OF THE DRAWING

FIG. 1 is a schematic drawing illustrating an embodiment of the present invention.

FIG. 2 is a side elevational view of heating means for forming a continuous baked sheet having a substantially uniform controlled thickness.

FIG. 3 is a side elevational view of apparatus in which a continuous baked thermoplastic sheet is formed into a continuous centerfilled tube.

FIG. 4 is a top plan view of the apparatus of FIG. 3.

FIG. 5 is a fragmentary perspective view of a product of the present invention.

FIG. 6 is a cross-sectional view of the product taken along lines 6—6 of FIG. 5.

FIG. 7 is a fragmentary perspective view of the tube forming and filling apparatus of this invention.

DETAILED DESCRIPTION OF THE INVENTION

In accordance with the present invention, the baked outer shell portion of the centerfilled product of this invention is formed from a batter which has as its principal ingredients mono-and/or disaccharides, flour, an edible fat or oil, egg white and water. These ingredients are mixed to provide a homogeneous semi-liquid batter which is formed into a relatively thin continuous layer of controlled thickness and heated to form a continuous elongated baked sheet or ribbon having a substantially uniform, predetermined thickness with the baked sheet having a bulk density of above about 30 lbs. per cu. ft. The batter has a relatively high content of mono-and/or disaccharides, so that the baked sheet is thermoplastic, that is, it is soft and pliable when at a temperature about 210° F. and above, but becomes hard and rigid upon cooling. However, upon each reapplication of heat, such as by heating to a temperature of about 240°-270° F. for 3-5 minutes, the baked sheet again becomes pliable and flexible. It is essential that the thickness of the batter layer be controlled during its formation and baking so that the finished baked sheet will have a thickness equal to the desired thickness of the baked outer shell portion of the centerfilled product of this invention. The thickness of the baked sheet will depend on the desired shell to filling ratio and overall tube diameter of the product, which affects the texture, flavor and mouthfeel of the product, and may be in the range from about 1/32" to ¼" or more, with a thickness in the range of between 1/16" to 5/32" being preferred.

The thickness of the baked sheet is controlled by carrying a layer of the semi-liquid batter between a pair of opposed heated moving surfaces which are vertically spaced apart a distance equal to the desired thickness of the baked sheet, with the heated surfaces moving in the same direction at the same linear speed. The batter may be retained between these moving heated surfaces until baking of the batter layer is completed, that is, until the batter layer has been baked into a continuous sheet having sufficient cohesion and strength to be self-supporting. Alternatively, the batter may be retained between the heated moving surfaces only until the surfaces of the batter layer have been set, so that the partially baked batter layer will retain this controlled thickness. The partially baked sheet, having a moisture content of about 15%-25% by wt. may then be transferred to a conventional baking means, such as a continuous band oven for completion of baking.

Baking of the batter layer is completed when its moisture content has been reduced to about 5% or less, preferably between 2%-3%. At this moisture level the baked sheet is sufficiently cohesive to form a continuous self-supporting sheet and has sufficient tensile strength, elasticity and pliability to enable the baked sheet to be rolled into a tubular shape having a longitudinal butted seam while warm, and to become rigid, crisp and friable upon cooling so that when cooled it retains its tubular shape, that is, there is no separation or opening of the longitudinal butted seam.

The temperature at which the semi-liquid batter layer is baked to form the continuous sheet will depend upon the formulation of the batter and the desired thickness of the baked sheet, but should be at least 210° F. or above, and usually is in the range of from about 275° F. to 550° F. The heated moving vertically spaced surfaces between which the batter layer is carried may be at the same or different temperatures.

The time of baking will depend on the thickness of the batter layer, the formulation of the batter and the baking temperature, and may range from a few seconds to 10 minutes or more.

In the embodiment of the invention shown in FIG. 1, the semi-liquid batter is prepared having a relatively high content of mono-and/or disaccharides, and deposited in controlled amounts on a first or lower heated endless belt which carries the batter as it is heated and baked to form a continuous baked thermoplastic sheet. A second or upper endless belt having a heated lower run is disposed parallel to and overlies the lower endless belt, with the heated opposed facing belt runs being vertically spaced apart so that a gap is provided between the opposed facing runs. The lower run of the upper belt is sufficiently proximate the upper run of the lower belt so as to contact the upper surface of the batter layer being carried on the lower belt and gauge the thickness of the batter layer. Thus, the facing runs of the lower and upper endless belts, which move in the same direction at substantially the same linear speed, are vertically spaced apart a distance equal to the desired thickness of the baked shell portion of the product of this invention, that is, about 1/32" to ¼" or more. Heating units, such as radiant heaters, ribbon burners, and the like, are positioned adjacent the facing runs of both the upper and lower endless belts to heat the batter layer and bake it into a continuous sheet as it is carried by the lower belt. The speed of the belts and the baking temperature are coordinated so that the continuous baked sheet, at the completion of the baking step, will have a temperature of about 210° F. or above and moisture content of no more than about 5% by weight, preferably between 2%-3% by weight. While a uniform temperature may be provided throughout this baking step, it is usually preferred to reduce the temperature in one or more steps as the batter layer is baked. This may be carried out by providing a plurality of heating units, which can be independently controlled in temperature, adjacent the facing runs of the belts. For example, at the start of the baking cycle, when the batter is first carried between the belts, the temperature is relatively high, e.g., 500° F., to facilitate rapid setting of the surfaces of the sheet. One or more intermediate temperature zones having a slightly lower temperature, e.g., 450° F., and a final heating zone at a lower temperature, e.g., 400° F. are provided to complete baking of the batter layer and reduce the moisture content of the baked batter layer to no more than about 5%.

Alternatively, the batter layer may be carried between the opposed vertically spaced heated endless belts to only partially bake the batter layer, that is, to heat the batter layer only to the extent that the surfaces of the batter layer have been set, so that the partially baked batter layer will retain this controlled thickness. The partially baked sheet, which has a moisture content of about 15%-25% by wt., may then be transferred to conventional baking means, such as continuous band oven or the like for completion of the baking step in which the moisture content of the sheet is reduced to 5% or below.

In accordance with another embodiment of the invention, a layer of the batter may be deposited on the upper run of the upper endless belt and carried on the upper belt between the facing runs of the belts to gauge the thickness of the batter layer and at least partially bake the batter layer. The types and amounts of ingredients used in the batter are such that the baked sheet is thermoplastic, will maintain a uniform thickness, be sufficiently cohesive to form a continuous sheet, and have sufficient tensile strength, elasticity and pliability to enable the continuous baked sheet to be continuously rolled into a tubular shape while warm and to become rigid and friable upon cooling, so that the cooled tube retains its shape. As noted hereinabove, mono-and/or disaccharides, flour, and edible fat or oil, egg white and water are the principal ingredients of the batter. The batter has a relatively high content of mono-and/or disaccharides, that is, between about 15%–45% by weight, and preferably from about 30%–40% by weight, of the batter mix. Such a level of mono-and/or disaccharides in the batter provides the baked batter layer with a texture and structure such that it is thermoplastic, that is, the baked sheet is soft and pliable while at a temperature of about 210° F. and above, but becomes crisp, rigid and friable upon cooling. However, each time the baked layer is reheated to above about 210° F., it again becomes pliable and flexible. Suitable mono-and/or disaccharides which may be used include sucrose, fructose, dextrose, invert sugar, corn syrup solids, lactose, and the like. Generally, it is preferred to use cane or beet sugar in either powdered or granulated form as the mono-and/or disaccharide in the batter.

The flour component may comprise from 10%–20% by weight of the batter mix, with amounts of between about 12% and 16% by weight being preferred. The flour may be derived from wheat, corn, rye, soy, barley, and the like, and mixtures thereof. Wheat flour is preferred.

Any of the edible animal and vegetable fats and oils generally used in baked foods may be used in the batter mix, including, for example, batter, lard, margarine and hydrogenated vegetable oil shortenings made from oils such as soybean oil, cottonseed oil, corn oil, peanut oil, coconut oil, palm oil and the like, and mixtures thereof. The fat or oil component may constitute from about 5%–15% by weight of the batter mix, with amounts of between about 10% and 13% weight being preferred.

Egg whites, which function as a binding material or toughener, are incorporated in the batter mix in either liquid, frozen or dry form (as egg white solids) in amounts of from about 2.5%–15% by weight of the mix. Water, or other aqueous liquids, is present in the batter mix in an amount sufficient to provide the batter with a semi-liquid consistency, generally constituting from about 15%–30% by weight of the batter mix. Of course, minor amounts of other ingredients may be incorporated in the batter mix, such as for example, salt, flavorings, emulsifiers, leavening agents, starch, lecithin and the like. The selection and quantity of such other ingredients will depend largely upon the character, flavor and texture desired for the end product.

In preparing the batter, the ingredients, except for the fat or oil and emulsifier (if used) are thoroughly mixed with water until all of the dry ingredients are moistened. Fat or oil and emulsifier are then added to the mix with agitation to provide a homogeneous batter having a semi-liquid consistency. As noted above, the batter is deposited as a continuous layer on heating and conveying means which heat and bake the batter layer to form a continuous baked sheet having a controlled thickness.

Generally it is preferred that the tubular centerfilled product of this invention have an outside diameter in the range of from about ⅜" to 1", depending on the intended use of the product, that is, a cookie, snack item, and the like. Accordingly, the baked batter layer must have a width at least sufficient to form a tube having the outside diameter desired in the finished product, when the sheet is rolled around its longitudinal axis and the edges of the sheet butted together. Thus, the width of the baked sheet which is rolled into a tube is equal to the circumference of the finished centerfilled product.

When the semi-liquid batter is formed into a continuous layer and baked to form the continuous thermoplastic sheet, the width of the batter layer being baked may be controlled to provide a continuous baked sheet having a width such that when the baked sheet is rolled around its longitudinal axis and the edges of the sheet butted together, it forms a tube having the desired outside diameter. Alternatively, a relatively wide layer of batter may be formed on the heated endless belt and baked to provide a continuous sheet which upon completion of baking is subsequently cut into a plurality of continuous longitudinal strips of the desired width such as by passing the baked sheet through a plurality of spaced rotary or stationary knives disposed at or near the discharge end of the conveyor on which the baked sheet is carried. Thus, the baked sheet is cut into a plurality of continuous longitudinal strips, each of which have a width equal to the circumference of the finished centerfilled product. When such a wide batter is formed, it should have a width of no more than about 12 inches in order to permit escape of gases generated in the sheet during baking without disrupting the integrity of the sheet.

When the continuous batter layer has been baked to the desired extent, i.e. until its moisture content has been reduced to about 5% or less, the resulting continuous sheet while still warm and pliable, is formed into a continuous tube having a longitudinal, non-overlapping or butted seam. Thus, the baked sheet, having a desired width, is transferred onto a flexible, deformable, forming conveyor belt which has its feed end located adjacent the discharge end of the endless belt on which the sheet is carried during its baking, and moves in the same direction and at the same linear speed as the endless baking belt. This forming conveyor belt carries the baked dough sheet, while warm and pliable, through a closed forming tube in which the continuous baked sheet is formed into a continuous cylindrical tube. As this belt, which is flexible and deformable, enters the forming tube, the lateral edges of the flat belt are progressively raised and the belt progressively curved until the edges of the belt meet to form a closed cylindrical tube. The pliable, thermoplastic baked sheet which is carried on the flexible forming belt conforms in shape to the shape of the belt and is also formed into a closed cylindrical tube with the longitudinal edges of the sheet butted together to provide the tube with a non-overlapping longitudinal seam.

The baked sheet has a moisture content of no more than about 5% and a temperature of at least about 210° F. when it is carried into the forming tube and formed into a tubular shape, so that the baked sheet will be sufficiently pliable to be formed into a closed cylindrical tube without cracking of the sidewalls of the tube and will have sufficient cohesion and strength to hold together.

The cylindrical tube thus formed is confined until it has cooled to an extent to become sufficiently rigid to retain its tubular shape without opening or separation of the longitudinal seam, this is, until the baked batter has cooled to a temperature below about 200° F., preferably between about 95°–100° F. or below. Because of its relatively high mono-and/or disaccharide content, and the fact that the thickness of the sheet is restricted during baking, the baked batter is rigid, crisp and friable at such temperatures, so that upon cooling, the closed cylindrical tube retains its shape with no separation or opening of the closed longitudinal seam. In order to facilitate cooling of the baked batter tube, the forming tube through which the baked sheet is carried, is surrounded by a cooling jacket through which a refrigerant, such as cold water or glycol, is circulated.

An edible filling material is continuously deposited into the center of the baked tube as it is carried through the forming tube to fill the core of the tube. While the nature of the filling material may vary depending on the intended use of the product, it is generally preferred to use a viscous material such as confectionary creme, fruit paste, meat paste, cheese paste, and the like, which has a visocity such that it is sufficiently fluid to be pumpable when warm but upon cooling will be sufficiently stiff and firm to be retained within the baked tubular shell. However, it is important that the filling material have a water activity (Aw) of no more than 0.2. Since the baked tube in which the filling is deposited has a relatively high mono-and/or disaccharide content, it is hygroscopic. If the filling material has a water activity of higher than 0.2, moisture from the filling would be readily absorbed by the tubular shell, causing the shell to become soft and soggy rather than being rigid, crisp and friable, and causing the longitudinal seam of the shell to open up. When such a viscous filling material having a low water activity is used, it is injected into the baked tubular shell at a point after the baked strip is rolled into tubular shape and the edges of the baked strip are butted together. This gives the baked material an opportunity to cool somewhat before the introduction of the filling, thereby eliminating problems which may arise relating to melting or thermal degradation of heat sensitive fillings. It also reduces the risk of filling material escaping from the tubular shell. This is accomplished by pumping the filling material through a center filling tube which extends axially into the forming tube at the inlet end thereof to a point beyond that at which the edges of the baked strip are butted together to form a closed cylindrical tube. The filling material is introduced into the center of the cylindrical tubular shell at a velocity substantially equal to the velocity at which the tubular shell is carried through the forming tube, so that the center filling is continuous and uniform within the shell. Other edible filling materials such as, for example, dry granular powders and solid materials, may be filled into the core of the baked tube by suitable means.

According to an embodiment of the invention, a confectionary creme having a maximum water activity of 0.2 is filled into the center of a continuous, baked tube to provide a cylindrical, centerfilled cookie product. Such a filling material contains as its principal ingredients between about 20%–50% by weight of a sugar, such as granulated sugar, powdered sugar, brown sugar, dextrose, corn syrup solids, and the like, and combinations thereof, and between about 20%–40% by weight of an edible animal or vegetable fat or oil, such as butter, lard, hydrogenated vegetable oil shortenings, and the like, and combinations thereof. Minor amounts of other ingredients, such as salt, flavoring, antioxidant, emulsifiers, and the like, may be included, if desired. In a preferred embodiment, a proteinaceous material is included in the sugar-fat mix to provide a protein fortified cookie product. Preferably, non-fat dry milk solids are incorporated in the sugar-fat mix in amounts up to about 40% by weight of the mix, usually between 10%–40% by weight. Other suitable protein source materials may also be used, such as, for example, sodium caseinate, calcium caseinate, vegetable protein isolates, and the like. Vitamins, minerals and other nutrients may also be included if desired. In preparing such a filling mix, the shortening and emulsifier are melted and cooled to a temperature of about 100°–110° F. The cooled fat mixture is then combined with a blend of the dry ingredients (such as powdered sugar, nonfat milk solids, salts, etc.) in a mixer equipped with suitable agitating means until the texture is creamy and uniform. The mix then is pumped by a metering pump through an overrun control device that whips the filling mix until it becomes slightly stiff and has an overrun which may range from 0%–100%. The mix is then pumped through a filling tube which extends axially into the forming tube at the inlet end thereof to continuously deposit the filling in the baked tubular shell at a point after the tubular shell has been formed.

The continuous filled tube, after being cooled to a temperature below 200° F. is carried from the forming tube by the forming belt and is subsequently cut into pieces of desired length, say from about 1–3 inches, by any suitable cutting means such as a reciprocating knife, rotary cutting blade, high speed saw, guillotine knife, water knife, and the like, and packaged in suitable moisture-impermeable packaging material. The ratio by weight of the filling material to the baked dough shell in the finished product may range from about 0.33–1.5:1, depending on the nature and intended use of the product. The product has a relatively high bulk density, on the order of about 10–50 lbs. per cu. ft., and has a water activity (Aw) of about 0.1–0.40.

Referring now more particularly to the drawings, the apparatus of the present invention includes a general frame 10 serving as a support and mounting for a baking unit 11, tube forming and filling means 12 and cutting means 14.

The baking unit 11 comprises a lower endless conveyor belt 15 adapted to receive a semi-liquid batter and carry a layer of batter as it is baked into a continuous sheet, an upper endless belt 16 disposed parallel to and vertically spaced a predetermined distance above lower conveyor belt 15 to gauge the thickness of the batter layer, and heating means 31 and 32 disposed adjacent the facing runs of lower and upper belts 15 and 16 respectively to bake the batter layer as it is carried on the lower belt.

As shown in FIG. 2, lower endless conveyor belt 15 having a substantially horizontal upper run 25, extends longitudinally along the frame and extends around idler pulley 20 and drive pulley 21 at the feeding and discharge ends respectively of conveyor belt 15. Pulleys 20 and 21 are freely rotatable about shafts 22 and 23 which are horizontal and parallel to one another, the shafts being mounted in bearings (not shown) secured to the frame. Lower conveyor belt 15 preferably comprises an imperforate stainless steel band for suitable rigidity, although other suitable materials may be used.

Upper endless belt 16 having a substantially horizontal lower run 24 is disposed above conveyor belt 15, parallel thereto, with the lower run 24 of belt 16 being uniformly vertically spaced above the upper run 25 of the conveyor belt 15 a distance equal to the desired thickness of the baked shell portion of the product of this invention, generally a distance of between about 1/32" to ¼". Upper endless belt 16 extends around idler pulley 26 and drive pulley 27 which are mounted for rotation about horizontal shafts 28 and 29 respectively which are parallel to one another and mounted in bearings (not shown) secured to the frame.

As shown in FIG. 2, upper endless belt 16, which is made of the same material as the lower belt, overlies a substantial portion of lower conveyor belt 15, with the feed end of upper belt 16 being longitudinally spaced a short distance from the feed end of the lower conveyor belt. Disposed above the endless conveyor belt 15, intermediate the feed end of lower conveyor belt 15 and the feed end of upper belt 16 is nozzle 30 adapted to deposit a uniform predetermined amount of semi-liquid batter on the upper run 25 of conveyor belt 15. Feeding means (not shown) associated with nozzle 30, cooperate with the nozzle to deposit a continuous layer of the semi-liquid batter onto the upper run of belt 15 with the batter layer having a thickness at least equal to the desired thickness of the baked shell portion of the product of this invention.

Thus the upper run 25 of belt 15 and lower run 24 of belt 16 are axially aligned and vertically spaced apart to provide a gap therebetween, with the layer of semi-liquid batter being carried on the lower belt 15 into the gap to thereby gauge the thickness of the batter layer. Lower run 24 of belt 16 is sufficiently proximate to upper run 25 of belt 15 to contact the upper surface of the batter layer being carried on upper run 25.

One or more heating units 31 and 32 are mounted adjacent both facing belt runs 24 and 25 substantially the entire length of the facing belt runs. The heating units are adapted to heat the batter layer disposed between the facing runs and bake it into a continuous elongated sheet. Preferably a number of independently controlled heating units are mounted adjacent the facing runs 24 and 25, so that several temperature zones are provided over the length of the facing runs. However, in any given temperature zone, the heating units adjacent the upper and lower facing belt runs should be substantially the same temperature. Any suitable heating means capable of heating the batter layer to a temperature of between about 275° F.–550° F. may be used, such as for example, gas burners, electrical heating coils, resistance heating elements, and the like.

Lower and upper endless belts 15 and 16 are driven by motor means 33 to move in the same direction at the same linear speed. Drive chain 35 connects the motor 33 to the main drive shaft 36 mounted in speed reduction means 34. Drive chain 37 connects the drive pulley 27 of the upper endless belt 16 and drive pulley 21 of the lower endless conveyor 15 with the main drive shaft 36 through idler sprockets 38a, 38b, and 38c, so that the upper belt 16 moves in the same direction as and uniformly with the lower conveyor belt 15 in the direction indicated by the arrows.

According to one embodiment of the invention, a vertically disposed endless belt 40, made of the same material as conveyor belt 15, is mounted adjacent both edges of the lower conveyor belt 15 at the feeding end thereof to confine the semi-liquid batter and thereby control the width of the semi-liquid batter on the lower conveyor belt. Thus, the vertical belts 40 extend from a point forward of nozzle 30 to a point where the semi-liquid batter has been baked sufficiently that it is no longer flowable. Each vertical belt extends around an idler pulley 41 and a drive pulley 42 which are freely rotatable about vertical shafts 43 and 44 respectively, the shafts being mounted in bearings attached to the frame. Drive chain 53 connects drive pulley 42 with the main drive shaft 36 so that the vertical endless belts 40 move in the same direction and at the same linear speed as lower and upper horizontal endless belts 15 and 16.

In this embodiment, both lower and upper belts 15 and 16 have a width substantially equal to the desired circumference of the tubular shell portion of the product of this invention. Since the vertical endless belts 40 confine the edges of the batter layer, the baked batter layer will also have a width substantially equal to the desired circumference of the tubular shell.

If desired, endless belts 15 and 16, and the batter layer carried therebetween, may have a width substantially greater than the desired circumference of the tubular shell. In such event, a plurality of suitable cutting means, such as stationary or rolling knives (not shown) are provided at or near the discharge end of the baking means to cut the continuous wide baked sheet into continuous strips having a width substantially equal to the desired circumference of the tubular shell.

The lower and upper endless belts 15 and 16 may both have a length sufficient that the batter layer is completely baked (i.e., it has a moisture content of no more than 5%) when the batter layer reaches the discharge end of lower conveyor 15. Alternatively, the lower heated run 24 of upper endless belt 16 may overlie lower endless belt 15 only adjacent to the feed end of the lower belt a distance sufficient to gauge the thickness and heat the batter layer until it has become set, so that the batter layer will retain its set thickness. Thereafter, the batter layer may be heated only on the lower endless belt 15 or may be transferred to other conventional baking means such as a continuous band oven for completion of baking of the batter layer.

Located adjacent the discharge end of the lower endless conveyor 15 is the feed end of tube forming and filling means 12 which is adapted to receive the continuous baked batter sheet from conveyor belt 15. The tube forming and filling means 12 comprises a deformable, flexible endless conveyor belt 45 made of canvas, cotton, filled dacron or other suitable flexible and deformable material, arranged so as to have a substantially horizontal upper run 46 which is axially aligned and substantially co-planar with upper run 25 of endless conveyor 15. Thus, deformable endless belt 45 is disposed end to end in longitudinal line with endless conveyor 15, the deformable belt 45 having a feed end located adjacent the discharge end of lower endless conveyor 15 and adapted to receive from the lower endless conveyor the continuous baked sheet, with the baked sheet being transferred onto the upper run 46 thereof. Deformable endless belt 45 extends around idler pulley 47 and drive pulley 48 at the feed and discharge ends respectively. Pulleys 47 and 48 are rotatably mounted in bearings (not shown) mounted on the frame. Drive chain 49 connects the drive pulley 48 of flexible conveyor belt 45 with the drive pulley 21 of lower endless conveyor belt 15 so that the flexible conveyor belt 45 moves in the same direction and at the same linear speed as lower endless conveyor belt 15.

The upper run 46 of flexible belt 45, which carries the continuous baked sheet, passes through tubular member 50, which has a converging guide 51 at the inlet thereof, and through guide ring 52 which is secured to the frame 10 intermediate the discharge end of tubular member 50 and drive pulley 48. Tubular member 50 is surrounded by a cooling jacket through which a refrigerant such as cool water, glycol, and the like is circulated through inlet 55 and outlet 56. Tubular member 50 has a bore extending therethrough, the bore having a diameter which is substantially equal to the desired outside diameter of the centerfilled product of this invention, plus twice the thickness of the flexible belt, and may be in the range of from about ⅜" to 1". Flexible conveyor belt 45 has a width which is substantially equal to the circumference of the shell portion of the product of this invention. As the flexible conveyor belt 45 moves through converging guide member 51 into the tubular member 50, the lateral edges of the flat belt are progressively raised and the belt progressively curved until the edges of the belt meet to form a closed cylindrical tube at a point adjacent the inlet end of the tubular member. The belt is retained in this tubular configuration until the belt moves through guide ring 52. The continuous baked thermoplastic sheet which is carried on belt 45 has a width substantially equal to the width of deformable belt 45. The baked sheet, as it is carried into tubular member 50, is at a temperature of about 210° F. or above so that it is flexible and pliable so that it conforms in shape to the shape of belt 45. Accordingly, as the baked sheet is carried by the flexible conveyor belt 45 through converging guide 51 into tubular member 50, the lateral edges of the sheet are progressively raised and curved until the edges of the sheet are butted together to form a closed cylindrical tube having a longitudinal butted or non-overlapping seam. As the cylindrical tube formed from the baked sheet is carried through tubular member 50 it is cooled to an extent that it becomes rigid and friable so that as the continuous baked tube is carried beyond guide ring 52 it is sufficiently rigid to retain its tubular shape without opening or separation of the longitudinal seam.

Filling tube 58 extends axially into the tubular member 50 to a point beyond that at which the edges of the baked sheet are butted together to form the cylindrical tube, for continuously introducing a viscous edible filling material into the center portion of the tube. The filling material, which has an overrun of about 30%-100%, is pumped from metering cylinder 59 through the filling tube 58 into the center of the cylindrical baked tube at a velocity substantially equal to the velocity at which the baked tube is carried through tubular member 50 so that the center filling is continuous and uniform and completely fills the core of the baked tube. As the center-filled tube is carried through tubular member 50 it is cooled sufficiently that the filling material becomes firm and is retained within the tubular shell.

As the continuous center-filled tubular product is discharged from flexible conveyor belt 45 it is cut into pieces of desired length by suitable cutting means 14 provided at the discharge end of belt 45, and the cut pieces packaged in any suitable manner in moisture-impermeable packaging material.

As seen in FIGS. 5 and 6, the product of this invention comprises a rigid, tubular baked shell 64 which surrounds and encases a core 65 of edible material, the tubular shell having a longitudinal, non-overlapping butted seam 66.

The invention will be disclosed with more particularity in the following examples, which are intended to illustrate the present invention.

EXAMPLE I

A tubular centerfilled food product was made in accordance with the process disclosed hereinabove and using the apparatus shown in the accompanying drawings. A semi-liquid batter was prepared from the following ingredients:

|  | Percent by wt. |
|---|---|
| Sugar | 35.5 |
| Wheat Flour | 13.5 |
| Shortening | 11.5 |
| Cocoa | 9.0 |
| Egg white solids | 3.4 |
| Pregelatinized corn starch | 2.5 |
| Leavening | 1.6 |
| Salt | 0.5 |
| Emulsifier | 0.5 |
| Water | 22.0 |
|  | 100.0 |

In preparing the batter the dry ingredients were thoroughly mixed and the water added to the mix. The emulsifier and shortening were then added with agitation to form the batter.

The semi-liquid batter was deposited as a continuous layer on the upper heated run of a lower, imperforate stainless steel endless belt 1¾" wide. A vertical, imperforate stainless steel belt, approximately 1" wide, was provided adjacent both lateral edges of the lower endless belt to contain the semi-liquid batter on the lower belt. An upper imperforate stainless steel endless belt, also 1¾" wide, was disposed above the lower endless belt with the lower run of the upper belt being vertically spaced ⅛" above the upper run of the lower endless belt. The batter layer was carried on the lower endless belt into the gap between the facing belt runs to provide the batter layer with a uniform thickness of ⅛". Heating units disposed adjacent the facing belt runs heated the batter layer to a temperature of about 400°–500° F. as it was carried on the lower endless belt, with the batter layer being retained between the heated belt runs until the moisture content of the batter layer was reduced to about 3%.

The continuous baked sheet, 1¾" wide × ⅛" thick, was transferred from the lower endless belt to a flexible dacron endless belt, also 1¾" in width, disposed end to end in longitudinal line with the lower endless belt, and carried on the flexible endless belt through a forming tube having an internal diameter of 9/16". The baked sheet carried on the flexible belt had a temperature of above 210° F. as it entered the forming tube. As it was carried through the forming tube, the lateral edges of the baked sheet were progressively raised and curved until the edges were butted together to form a continuous tube having a longitudinal non-overlapping seam.

An edible filling material was prepared from the following ingredients:

|  | Percent by wt. |
| --- | --- |
| Sugar | 40.0 |
| Shortening | 30.0 |
| Non-fat dry milk | 20.0 |
| Butterfat | 7.5 |
| Emulsifier | 2.2 |
| Salt | 0.2 |
| Flavor, antioxidant | 0.1 |
|  | 100.0 |

In preparing the filling, the dry ingredients were thoroughly mixed and added to a mixture of fat and emulsifier, which was at a temperature of about 100°–110° F. The resulting mix was whipped until it became slightly stiff. The filling was then pumped through a filling tube which extended axially into the forming tube at the inlet end thereof to continuously deposit the filling material into the core of the tube of baked batter, with the filling being injected at a point after the edges of the baked sheet had been butted together. The filled tube was retained in the forming tube until the temperature of the shell was reduced to below 150° F. so that the shell was rigid and friable.

The cooled filled tube was then carried on the flexible belt from the forming tube to cutting means which cut the continuous filled tube into pieces about 3" in length.

The centerfilled product thus produced had an outside diameter of about 9/16" with a baked shell thickness of ⅛". The filling material completely filled the core of the tube. There was no opening or separation of the longitudinal butted seam of the cooled shell.

EXAMPLE II

This example illustrates the production of a sweet bakery centerfilled product in accordance with the process of the present invention, in which a high level of disaccharides is included in the batter. Thus a semi-liquid batter was prepared from the following ingredients:

|  | Percent by wt. |
| --- | --- |
| sucrose or lactose | 37.6 |
| wheat flour | 10.0 |
| cocoa | 8.2 |
| margarine | 7.1 |
| egg white solids | 5.2 |
| vital wheat gluten | 4.8 |
| pregelatinized corn starch | 3.6 |
| leavening | 2.0 |
| emulsifier | 1.0 |
| salt | 0.5 |
| water | 20.0 |
|  | 100.0 |

In preparing the batter, the dry ingredients were thoroughly mixed and the water added to the mix. The emulsifier and margarine were then added with agitation to form the batter.

The resulting semi-liquid batter was deposited as a continuous layer on the upper heated run of an upper oven-quality iron endless belt 26" wide. Two strips of batter, each 12" wide, were deposited on each half of the upper endless belt. A lower oven-quality iron endless belt, 28" wide, was disposed below the upper endless belt, with the lower run of the upper belt being parallel to and vertically spaced ⅛" above the upper run of the lower endless belt. The batter layer was carried on the upper endless belt into the gap between the facing belt runs to provide the batter layer with a uniform thickness of ⅛". Heating units disposed adjacent the facing belt runs heated the batter layer to a temperature of about 250°–350° F. as it was carried on the lower endless belt, with the batter layer being retained between the heated belt runs to only partially bake the batter layers, that is, until the moisture content of the batter layers was reduced to about 15–25%.

The two continuous baked sheets, each 12" wide × ⅛" thick, were then transferred from the lower endless belt to a continuous band oven belt and baked until a moisture level of less than 5% is achieved. After baking, the 12" strips of baked product were cut and trimmed into continuous longitudinal strips each being 1¾" wide. Each of the baked longitudinal strips thus formed was transferred to a flexible endless belt and formed into a continuous tube using the same procedure described in Example I.

An edible filling material was prepared from the following ingredients:

|  | Percent by wt. |
| --- | --- |
| sucrose | 52.3 |
| shortening | 20.0 |
| nonfat dry milk | 18.7 |
| butterfat | 7.4 |
| emulsifier | 1.3 |
| salt | 0.2 |
| flavor, antioxidant | 0.1 |
|  | 100.0 |

In preparing the filling, the dry ingredients were thoroughly blended and added to a mixture of fat and emulsifier, which was at a temperature of about 120°–165° F. The resulting mix was whipped until it became slightly stiff. The filling was then pumped through a filling tube which extended axially into the forming tube at the inlet end thereof to a point beyond which the edges of the longitudinal strips were butted together, to continuously deposit the filling material into the core of the tube of baked batter. The filled tube was retained in the forming tube until the temperature of the shell was reduced to below 150° F. so that the shell was rigid and friable.

The cooled filled tube was then carried on the flexible belt from the forming tube to cutting means which cut the continuous filled tube into pieces about 3" in length.

EXAMPLE III

The same process is followed as in Example II, except that the semi-liquid batter was prepared from the following ingredients, in which mono-and disaccharides are used to provide a thermoplastic baked sheet and produce a non-sweet, snack food centerfilled product.

|  | Percent by wt. |
| --- | --- |
| wheat flour | 16.90 |
| margarine | 7.20 |
| dextrose | 6.60 |
| corn syrup solids | 6.60 |
| lactose | 6.60 |
| malto-dextrin | 6.60 |

-continued

|  | Percent by wt. |
|---|---|
| vital wheat gluten | 6.00 |
| egg white solids | 5.50 |
| malt powder | 3.90 |
| pregelatinized corn starch | 3.50 |
| leavening | 2.50 |
| salt | 1.00 |
| emulsifier | 0.60 |
| water | 26.50 |
|  | 100.0 |

EXAMPLE IV

The same process is followed as in Example II, except that the semi-liquid batter was prepared from the following ingredients, in which monosaccharides were used to provide a thermoplastic baked sheet and produce a non-sweet, snack food centerfilled product:

|  | Percent by wt. |
|---|---|
| dextrose | 26.40 |
| wheat flour | 16.83 |
| margarine | 7.20 |
| vital wheat gluten | 6.00 |
| egg white solids | 5.50 |
| malt powder | 3.90 |
| pregelatinized corn starch | 3.50 |
| leavening | 2.50 |
| salt | 1.00 |
| emulsifier | 0.67 |
| water | 26.50 |
|  | 100.00 |

The non-sweet snack food product produced in Examples III and IV were filled with an edible filling material which included the following ingredients:

|  | Percent by wt. |
|---|---|
| dehydrated meat | 30.00 |
| shortening | 23.00 |
| pregelatinized corn starch | 9.00 |
| potato starch | 9.00 |
| malto-dextrin | 9.00 |
| corn syrup solids | 9.00 |
| butterfat | 8.50 |
| emulsifiers | 1.30 |
| spices | 1.00 |
| flavor, antioxidant | 0.20 |
|  | 100.00 |

The dry ingredients were combined with approximately 30% of the formula weight of shortening which was at a temperature of 120°–150° F. This mixture was processed to reduce its particle size, followed by heating to a temperature of 100°–125° F. The resulting mixture was then processed and injected into the continuous tubular shells using the same procedure described in Example II.

The centerfilled products produced in Examples II–IV had an outside diameter of about 9/16″ with a baked shell thickness of 1/8″. The baked shell portion of the products produced in Examples II–IV each had a bulk density of about 36 lbs. per cu. ft. The filling material used in these examples had a water activity of no more than 0.2, and completely filled the core of the tube. There were no openings or separations of the longitudinal butted seam of the cooled shell.

While the invention has been described and illustrated with reference to a particular preferred embodiment, it is to be understood that this is only illustrative and not intended to limit the scope of the invention. Rather, the invention encompasses modifications, variations and rearrangements of parts which fall within the scope of the appended claims.

What is claimed is:

1. A continuous process for producing a tubular centerfilled food product having an edible baked thermoplastic shell surrounding a core of edible filling material, which comprises
preparing a semi-liquid batter having a relatively high content of mono-and/or disaccharides,
carrying a layer of said semi-liquid batter between a pair of opposed, vertically spaced apart, heated moving surfaces to form between said surfaces a continuous layer of batter having a controlled, set thickness,
continuously passing said batter layer through a heating zone in which the batter layer is heated to a temperature and for a time sufficient to bake the batter layer into a continuous, elongated, pliable, deformable thermoplastic sheet having a temperature of at least about 212° F. and a moisture content of no more than about 5% by weight,
continuously passing said elongated, pliable, thermoplastic baked sheet while at a temperature above about 210° F. from said heating zone through a forming tube in which the edges of said sheet are progressively raised and curved until said edges are butted together to form a continuous cylindrical tube having a closed longitudinal butted seam,
continuously filling the core of said continuous tube with an edible viscous filling material at a point after the edges of the sheet are butted together,
cooling the filled tube until the baked sheet becomes rigid, and
cutting the cooled filled tube into pieces of desired length.

2. The process defined in claim 1 in which a layer of said semi-liquid batter is deposited on a first heated moving endless belt on which the batter layer is carried into a gap between said first endless belt and a second heated moving endless belt, said first and second endless belts having facing runs which are opposed, moving in the same direction at the same linear speed and vertically spaced apart a distance equal to the desired thickness of the baked shell portion of the centerfilled product, with said batter layer being retained between said first and second endless belts at least until the surfaces of the batter layer are set, and the batter layer is heated until the moisture content thereof is no more than about 5% by weight to thereby form the continuous, baked thermoplastic sheet.

3. The process defined in claim 2 in which the batter layer is deposited on the heated upper run of a lower endless belt and is carried on said lower endless belt into a gap between said lower endless belt and the lower run of an upper endless belt which overlies at least a portion of said lower endless belt.

4. The process defined in claim 3 in which the batter layer is retained between said heated lower and upper endless belts until the moisture content of said batter is reduced to no more than about 5% by weight to provide said continuous thermoplastic sheet.

5. The process defined in claim 2 in which the batter layer is deposited on the heated upper run of an upper endless belt and is carried on said upper endless belt into a gap between said upper endless belt and the heated upper run of a lower endless belt whereby the thickness of said batter layer is gauged by said upper and lower endless belts, and the batter layer is maintained between said upper and lower endless belts and heated until the moisture content of the batter layer is reduced to about 15%–25% by weight.

6. The process defined in claim 5 in which the heated batter layer having a moisture content of about 15%–25% is transferred from between said upper and lower endless belts and is further heated at a temperature above 212° F. to reduce the moisture content of the batter layer to no more than about 5% by weight to thereby form a baked continuous thermoplastic sheet having a uniform predetermined thickness.

7. The process defined in claim 1 in which the semi-liquid batter contains about 15%–40% by weight of mono-and/or disaccharides, 10%–20% by weight of flour, 5%–15% by weight of an edible fat or oil, about 2.5%–15% by weight of egg whites and about 15%–30% by weight of an aqueous liquid.

8. The process defined in claim 2 in which the continuous baked pliable thermoplastic sheet has a width substantially equal to the internal circumference of the forming tube through which the continuous pliable sheet is passed.

9. The process defined in claim 2 in which the continuous baked sheet, upon completion of heating, is cut into a plurality of continuous longitudinal strips each of which have a width substantially equal to the internal circumference of said forming tube, with each of said strips being passed through a separate forming tube.

10. The process defined in claim 1 in which said filling material is injected into said continuous tube through a filling tube which extends axially into the forming tube.

11. The process defined in claim 1 in which the filling material has a water activity of no more than 0.2.

12. The process defined in claim 1 in which the continuous filled tube is retained in said forming tube until the baked shell portion is cooled to a temperature of no more than about 95°–100° F.

13. The process defined in claim 1 in which the opposed heated moving surfaces are vertically spaced apart a uniform distance in the range of between 1/32" to 5/32".

* * * * *